March 22, 1932.    G. C. HERZ    1,850,719
APPARATUS FOR CLEANING COFFEE, COCOA BEANS, ETC
Filed Dec. 16, 1929    2 Sheets-Sheet 1
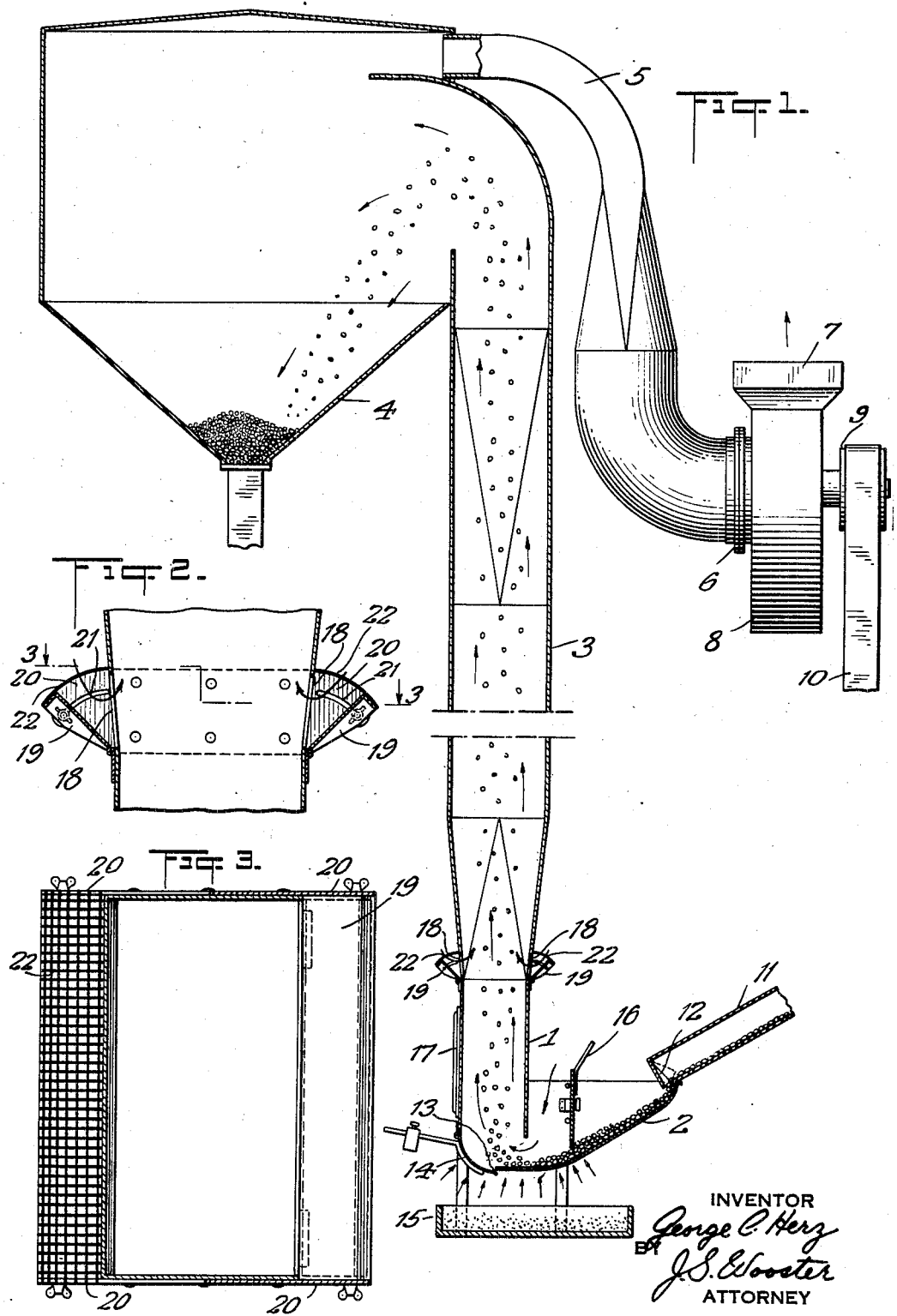

March 22, 1932.  G. C. HERZ  1,850,719
APPARATUS FOR CLEANING COFFEE, COCOA BEANS, ETC
Filed Dec. 16, 1929   2 Sheets-Sheet 2
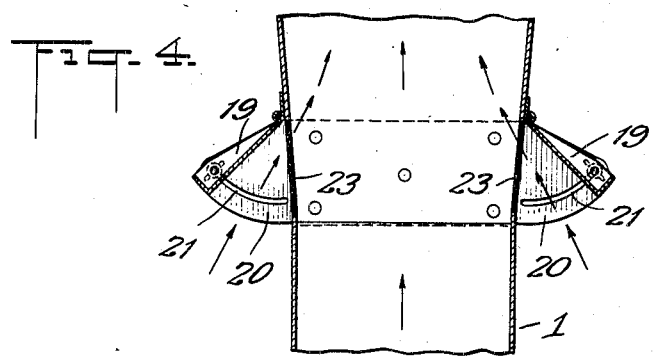
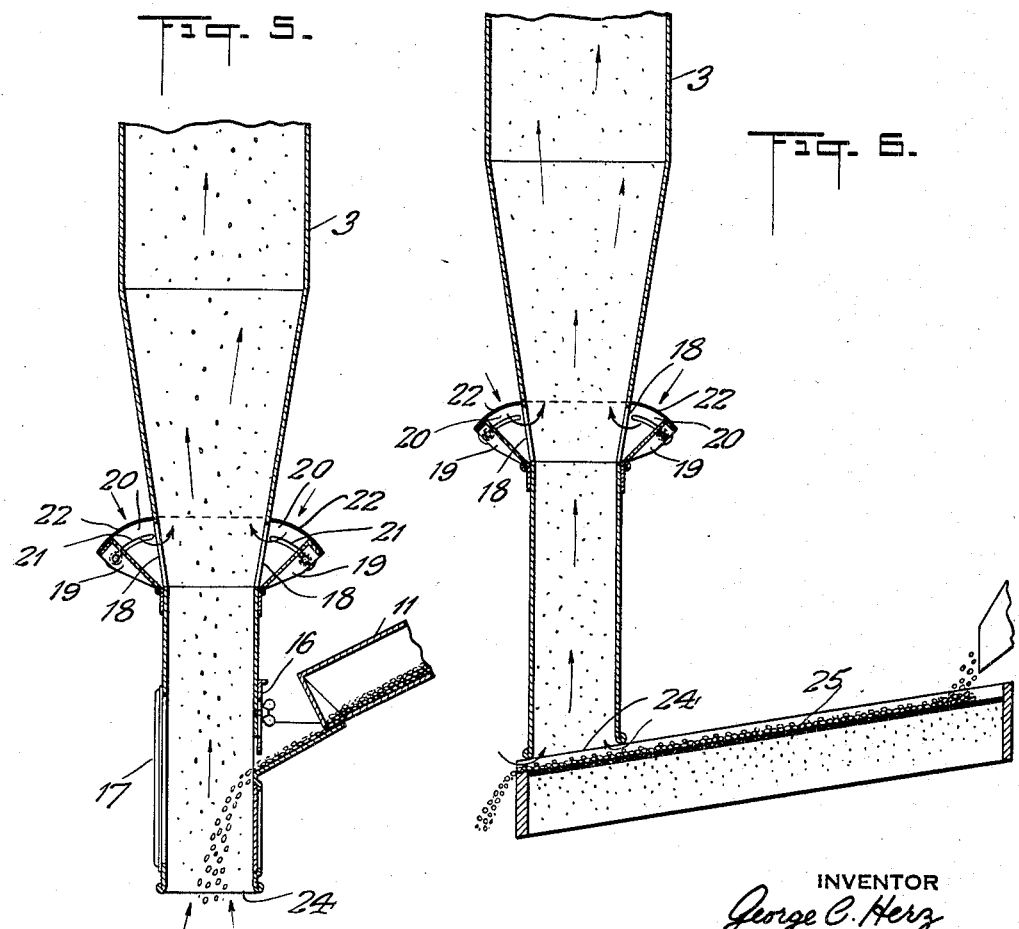
INVENTOR
George C. Herz
BY
J. S. Wooster
ATTORNEY Patented Mar. 22, 1932

1,850,719

UNITED STATES PATENT OFFICE

GEORGE C. HERZ, OF FLUSHING, NEW YORK, ASSIGNOR TO JABEZ BURNS & SONS, INC., OF NEW YORK, N. Y., A CORPORATION OF NEW YORK

APPARATUS FOR CLEANING COFFEE, COCOA BEANS, ETC.

Application filed December 16, 1929. Serial No. 414,421.

This invention relates to apparatus for cleaning coffee, cocoa beans, peanuts, grains and other similar goods either green or roasted, in their whole, cracked, granulated or ground state as such cleaning may be necessary or can best be accomplished. It particularly relates to apparatus employing air to separate the goods from comparatively heavier, that is denser, materials such as stones, nails, etc., or from comparatively lighter, that is less dense, materials such as hulls, chaff, shells, skins, etc.

Inasmuch as the separation of the materials by air involves consideration both of the weight of the material and its surface area, I have made use of the expression "density" to denote weight of the substance per unit surface area.

Certain products such as green coffee, raw shelled peanuts, etc., are very nearly the same density as the foreign materials to be removed. It is therefore customary to clean these products in the roasted state since they are then comparatively lighter, that is less dense, than in the green or raw state. Cocoa beans, on account of their large size, can usually be cleaned in the raw state.

As the objects to be attained and the methods employed are similar for the various separations to be made, I shall refer particularly to apparatus used for what is generally known as stoning roasted coffee, that is a separation from roasted coffee beans of such materials as stones, nails and other foreign materials of a denser composition.

Much of the foreign materials found in coffee beans is approximately the same size as the beans and therefore cannot be removed by sifting. Therefore it is customary to use air to separate the beans from the foreign matter. The usual air separator consists of a vertical pipe in which an upward current of air is produced by an exhaust fan. The goods are fed in at the lower end which is known as the boot, and the air is so regulated that it lifts the beans but leaves the denser foreign matter behind. The intermediate section known as the riser terminates in a hopper at the upper end designed to receive the beans and separate them from the rapidly moving air.

The principal objects of the invention are to control the amounts of air used, first, in the separating section of the apparatus, or boot, and second, in the elevating section, or riser; so that the cleaning or separating operations are speeded up, and the capacity thereby increased, the quality of the cleaning is vastly improved over that obtained with present apparatus, and the power required by the exhaust fan which furnishes the air is much reduced.

More air is required to carry a given amount of coffee up through the riser pipe to the hopper than is needed to lift that amount of coffee from the stoner boot to the riser pipe. In existing types of stoners, all the air required to separate the coffee in the boot and carry it up through the riser pipe to the hopper is taken in through the stoner boot. In such devices the quality of the stoning suffers because a higher velocity is used during the separation of the foreign materials than is necessary to lift the coffee from the boot to the riser. It is obvious that the higher the air velocity the larger and denser the foreign materials that will be lifted along with the coffee.

In order to maintain a high rate of coffee flow and a high quality of stoning this invention enables air to be admitted between the stoner boot and the riser. The amount of air admitted is such as to just make up the difference between the air requirements of the boot and the riser for the amount of coffee to be handled. These air requirements are determined by watching the weighing action in the boot. When the coffee is fed to the stoner at a certain rate of flow, a gate on the inlet of the exhaust fan and openings provided between the boot and the riser are so adjusted as to give the minimum air flows in the boot and riser respectively that will carry the required rate of coffee flow. This is exactly the adjustment for highest stoning quality and minimum power input to the fan.

Novel means are provided for varying the openings between the bot and the riser to permit the rapid and accurate regulation of the air.

The invention will be described in connection with the accompanying drawings in which:

Fig. 1 is a vertical section through an air separator embodying the invention;

Fig. 2 is an enlarged vertical section through the adjustable openings for admitting air at a point between the boot and the riser;

Fig. 3 is a transverse section taken on the line 3—3 of Fig. 2;

Fig. 4 is a vertical section showing a modified form of adjustable air inlet;

Fig. 5 is a vertical section through a device adapted for removing chaff or other light material from granulated coffee, etc.; and Fig. 6 is a similar view showing a modified arrangement for feeding the material to the apparatus.

Referring to Fig. 1, the separator comprises a boot 1 having a screen bottom 2 for receiving the goods to be cleaned, a riser 3 substantially higher than the boot, hopper 4, exhaust main 5, adjustable gate 6, air discharge pipe 7, and exhaust fan indicated generally at 8 and operated by pulley 9 and belt 10 driven from any suitable source of power.

The goods to be cleaned are fed to the boot by a pipe or chute 11 having an adjustable gate 12 to regulate the flow of material to the boot. An opening 13 is provided in the bottom of the boot and is normally closed by a hinged door 14 by means of which foreign material left in the boot may be dumped into the waste pan 15. The adjustable gate 16 in the boot may be positioned to spread the goods evenly over the bottom of the boot and produce a uniformly distributed flow. A sight glass 17 is provided in one side of the boot to permit observation of the weighing action which takes place.

The boot 1 is preferably rectangular in cross section and the riser 3 is usually a round pipe, the connection between them being tapered to prevent disturbance of the air currents as much as possible.

In order to increase the capacity and effect a more thorough separation between the beans and the foreign material, I provide an opening between the boot and the riser at a substantial distance above the point at which the goods are fed into the boot. In the preferred form shown in Figs. 1 to 3, air inlet openings 18 are provided in opposite sides, preferably extending across the full width of the pipe and the amount of air to be admitted to the bottom of the riser 3 is determined by the position of flaps 19. To control the position of the flaps, flap guides 20 are provided at each end of each opening 18, and the flaps are hinged between the flap guides and provided with wing nuts cooperating with arcuate slots 21 in the flap guides. Wire cloth screens 22 are placed over the flap guides 20 to prevent escape of any of the product.

In the operation of the apparatus, the flaps 19 are first closed and the gate 6 on the inlet of the exhaust fan is adjusted so that the amount of air passing up the riser is sufficient to lift all the beans into the hopper at the desired rate of coffee flow. With such adjustment, some of the smaller or less dense foreign materials would be carried up with the beans. To prevent this, the weighing action which takes place in the space intermediate the lower opening in the boot and the openings 18 is watched through the sight glass 17 and flaps 19 adjusted to admit air at this point, thus reducing the amount of air passing up the boot until it is the minimum amount that will lift all the beans without lifting the foreign matter. Since, in the preferred form of the invention, the openings 18 extend substantially the full distance across the weighing portion of the pipe, on opposite sides thereof, the additional air will be admitted with as little velocity as possible and as uniformly as possible, thus preventing eddy currents from being set up. The weighing action taking place in the boot can be clearly perceived through the sight glass 17.

Heretofore, any increase in the amount of air in a separator of this type would cause a corresponding increase in the boot as well as in the riser, making it impossible to lift the beans without also lifting smaller or less dense foreign material; and if the amount of air was reduced below a certain point, the beans would fall back into the boot and clog it.

Another modification of the invention is to place the flaps 19 upside-down, that is, hinge them at the top instead of at the bottom, this modification being shown in Fig. 4. This permits of easy entrance of the additional amount of air required as the air does not have to change its direction to the extent that it does in the form shown in Figs. 1 to 3. In this form of the invention wire screens 23 are secured directly over the air inlet openings 18.

The invention as outlined above permits of an accurate separation of a product such as roasted coffee from denser foreign matter such as stones, nails, etc. It is evident that it is equally valuable in separating a product from less dense foreign material and in this case the comparatively lighter material is lifted in the boot, the denser product remaining below. For instance, loose chaff and hulls can be separated from roasted coffee beans; loose hulls and shells from raw cocoa beans; chaff can be separated from roasted granulated coffee; shells can be separated from roasted cracked cocoa beans, etc. In each of these cases the less dense foreign material is lifted in the boot, the product passing through the opening in the bottom into a container or bin or conveyor, or otherwise disposed of.

This modification is shown in Fig. 5, in which the lower portion of the boot is extended below the point at which goods are fed to it and the bottom 24 left open so that the denser product falls into a bin or receptacle or other receiver. The amount of extension of the boot below the feed point is affected by the accuracy of the weighing action required and by the particular product being treated.

Another modification is shown in Fig. 6, in which the product is passed below the open lower end 24 of the boot by a shaking inclined blank sheet or perforated sieve 25, or by a perforated or unperforated traveling belt or other similar means. The position of the lower end of the boot is adjustable with relation to the means conveying the product. As the latter passes under the boot, the air passing upward through the boot lifts the less dense foreign material, the product passing on. The amount of air required to remove the foreign material can be very accurately regulated by adjusting the openings by means of the flaps 19.

It will be apparent that the invention is capable of various modifications and adaptations without departing from the scope and spirit of the invention as defined in the appended claims.

The invention claimed is:

1. Apparatus for separating materials of different densities comprising an air pipe having a feed opening adapted to receive the materials to be separated, means for drawing air upwardly through said pipe to lift materials therein, and air inlet openings in opposite sides of the pipe at a substantial distance above the feed opening and extending substantially the full width of the pipe.

2. Apparatus for separating materials of different densities comprising an air pipe having a lower boot portion and an upper riser portion, means to feed the material to be separated to the lower portion, means to draw air upwardly through said portions, said drawing means drawing sufficient air through said upper portion to move the material therethrough, and means between said upper and lower portions to admit air to the bottom of the upper portion, whereby to reduce the flow of air through said lower portion to substantially the exact amount necessary to separate and lift the material of the desired low density.

3. Apparatus for separating materials of different densities comprising an air pipe including a lower boot portion and an upper riser portion substantially higher than said boot portion, means for feeding materials to be separated to said boot portion, means to draw air upwardly through said pipe, and means adjacent the juncture of said boot and riser portion to admit air to said pipe whereby to reduce the flow of air in said boot portion relatively to the flow in said riser portion.

4. In an apparatus as claimed in claim 2, said air admitting means comprising air inlet openings located on opposite sides of said pipe.

Signed at New York, in the county of New York and State of New York, this 13th day of December, A. D. 1929.

GEORGE C. HERZ.